Figure 2:
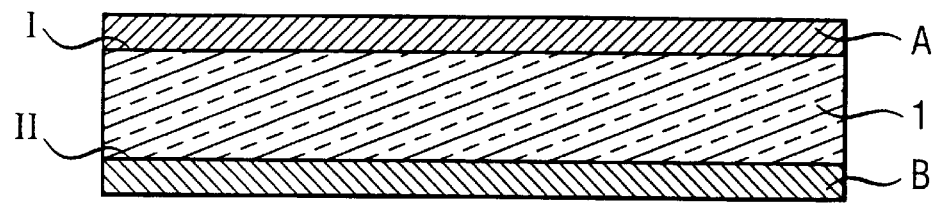

United States Patent [19]
Boire et al.

[11] Patent Number: 6,068,914
[45] Date of Patent: May 30, 2000

[54] GLAZING PANE HAVING AN ANTI-REFLECTION COATING

[75] Inventors: Philippe Boire, Paris; Georges Zagdoun, Colombes, both of France

[73] Assignee: Saint-Gobain Vitrage, Courbevoie, France

[21] Appl. No.: 08/981,822

[22] PCT Filed: May 14, 1997

[86] PCT No.: PCT/FR97/00857

§ 371 Date: May 14, 1998

§ 102(e) Date: May 14, 1998

[87] PCT Pub. No.: WO97/43224

PCT Pub. Date: Nov. 20, 1997

[30] Foreign Application Priority Data

May 14, 1996 [FR] France .................................. 96 05995

[51] Int. Cl.[7] .................................................... C03C 17/34
[52] U.S. Cl. ........................ 428/216; 359/360; 359/580;
  359/586; 359/589; 359/590; 428/212; 428/336;
  428/428; 428/432; 428/472; 428/697; 428/698;
  428/699; 428/701; 428/702
[58] Field of Search ..................... 428/216, 212,
  428/336, 428, 432, 697, 698, 701, 702,
  472, 699; 359/580, 586, 589, 590, 360

[56] References Cited

U.S. PATENT DOCUMENTS

| | | | |
|---|---|---|---|
| 3,432,225 | 3/1969 | Rock | 350/164 |
| 5,270,858 | 12/1993 | Dickey | 359/586 |
| 5,514,454 | 5/1996 | Boire et al. . | |
| 5,520,996 | 5/1996 | Balian et al. | 428/216 |
| 5,618,579 | 4/1997 | Boire et al. . | |
| 5,891,556 | 4/1999 | Anderson et al. | 428/432 |

FOREIGN PATENT DOCUMENTS

| | | |
|---|---|---|
| 0 492 785 | 7/1992 | European Pat. Off. . |
| 0 520 720 | 12/1992 | European Pat. Off. . |
| 2 713 624 | 6/1995 | France . |
| 60-050022 | 6/1985 | Japan . |
| WO 94 25410 | 11/1994 | WIPO . |

OTHER PUBLICATIONS

Laird et al "Durable Conductive Anti–Reflection Coatings for Glass and Plastic Substrates", Soc. of Vacuum oaters, 39th Annual Technical Conference Proceedings: 1996; pp. 361–365.

*Primary Examiner*—Archene Turner
*Attorney, Agent, or Firm*—Oblon, Spivak, McClelland, Maier & Neustadt, P.C.

[57] ABSTRACT

The invention relates to a glazing pane having an "A" antireflection coating on at least one of its external faces, which antireflection coating comprises a stack of layers of materials having alternately high and low refractive indices. At least some of the layers of the said stack are pyrolysed layers, especially the final layer.

35 Claims, 2 Drawing Sheets

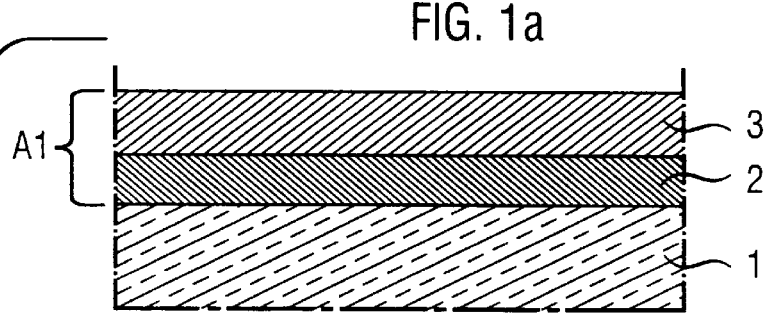
FIG. 1a
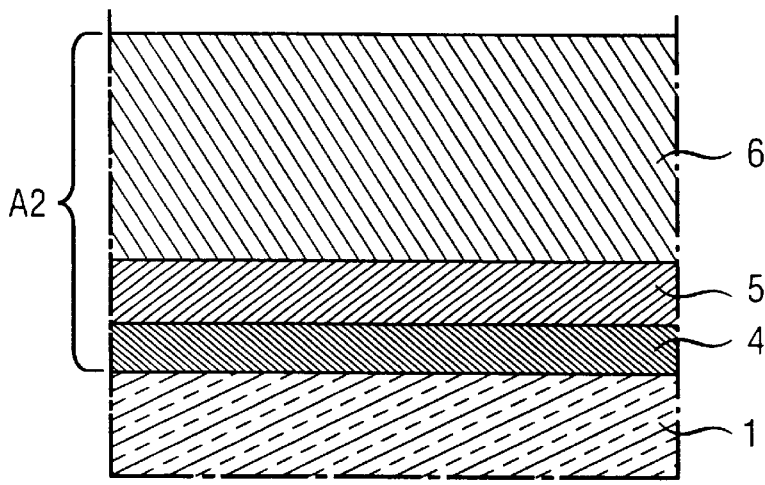
FIG. 1b
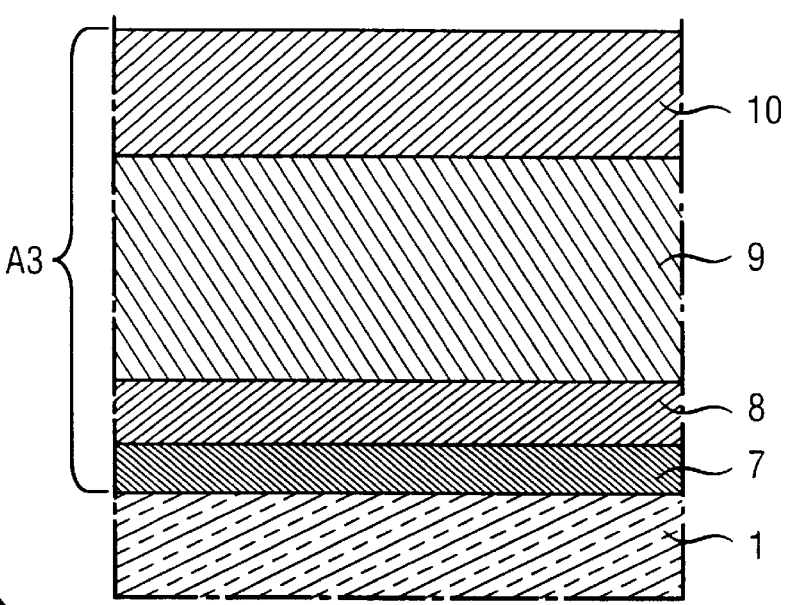
FIG. 1c
Fig. 1

GLAZING PANE HAVING AN ANTIREFLECTION COATING

BACKGROUND OF THE INVENTION

1. Field of the Invention

The invention relates to transparent substrates, more particularly glass substrates, intended to be incorporated in glazing panes and provided with antireflection coatings.

2. Description of the Background

An antireflection coating usually consists of a stack of interferential thin layers, in general an alternation of dielectric-based layers having high and low refractive indices. The function of such a coating, when deposited on a transparent substrate is to decrease its light reflection coefficient and hence to increase its light transmission coefficient. A substrate thus coated therefore has a higher transmitted light/reflected light ratio, which improves the visibility of objects placed behind it. In order to obtain a maximum antireflection effect, it is recommended to provide each of the faces of the substrate with this type of coating.

One of the best-known applications of this type of product is the protection of paintings illuminated by a light placed behind the observer. A glazing pane exhibiting an antireflection effect is also highly advantageous for equipping buildings for example as a shop window, so as to make it easier to distinguish what is in the window when the internal lighting is low compared to the external lighting, or as counter glass.

It will also be useful to employ this type of product as vehicle glazing pane, especially for a car, and most particularly as a windscreen, the standards imposing high levels of light transmission.

What currently limits the use of antireflection glazing panes in buildings or for equipping vehicles is the level of mechanical and chemical durability which is necessary in such applications. This is because the antireflection coating in the glazing pane will lie at least on its face 1, that is to say that face of the glazing pane turned to the outside of the room or of the passenger compartment (conventionally, each of the faces of glass substrates forming a given glazing pane is numbered by starting from the face which is turned towards the outside). Now, this face of the glazing pane is exposed to a great deal of stressing; thus, in buildings, it is subjected to the vagaries of the climate and to cleaning using quite abrasive means and/or using quite corrosive chemicals. The problem of durability is perhaps even more glaring in the case of glazing panes for vehicles—the windscreen is subjected to the abrasive effect of the to-and-fro action of the windscreen wipers and to the various projections of dust particles or gravel particles—and all side windows of vehicles are subjected to repeated rubbing against the rubber lips of the doors.

In fact, hitherto most antireflection coatings proposed are obtained by thin-film deposition using vacuum techniques, for example sputtering-type techniques. This type of deposition technique leads to the formation of thin layers which are of good quality, especially optical quality, but which often exhibit inferior durability compared to that which would be required for the applications envisaged above. Furthermore, these techniques are used in a subsequent operation, that is to say discontinuously on the glass panels once they have been cut up from the ribbon of glass coming from a float production line.

SUMMARY OF THE INVENTION

The object of the invention is therefore to remedy these drawbacks, while seeking to develop a novel type of multilayer antireflection coating which has a high optical performance and which, furthermore, exhibits a high mechanical and chemical durability.

The subject of the invention is a glazing pane having an antireflection coating on at least one of its external faces, which antireflection coating is described hereinafter by the name "A" coating and comprises a stack of layers of materials having alternately high and low refractive indices. The stack is designed so that at least some of the layers of which it is composed are pyrolysed layers, preferably at least the final layer.

It is possible, for example, to make provision for the first layers to be pyrolysed and for the final one or ones to be vacuum-deposited.

Advantageously, all the layers of the stack are pyrolysed layers.

Within the scope of the invention, "external" faces are understood to mean the faces of the glazing pane which are in contact with the atmosphere (as opposed to the so-called "internal" faces which are especially those in contact the polymeric interlayer in a glazing pane having a laminated structure).

There are three advantages in using pyrolysed layers:

on the one hand using pyrolysis, whether in the liquid phase, pulverulent phase or gas phase (the latter often being called by the acronym CVD, standing for Chemical Vapour Deposition), it is possible to obtain a vast choice of materials of the oxide, nitride or carbide type, or a mixture of at least two of these types of compounds, having refractive indices suitable for being incorporated in an antireflection coating;

on the other hand, pyrolysed layers, and it is this which is most particularly of advantage to the present invention, exhibit a chemical and mechanical durability which is generally very high. Due to the fact that they have been obtained by the decomposition of precursors at very high temperatures on hot glass, they are particularly strong, dense and highly adherent to the substrate, and are therefore well able to withstand mechanical attack of the abrasion/rubbing type or chemical attack, especially by coming into contact with water, polluting gases or aggressive detergents. What is highly advantageous, in order to guarantee the durability of the entire stack of layers, is for the final layer to be thus pyrolysed. The simplest way is then to deposit all the layers by pyrolysis because, and this is the third advantage of pyrolysis, this type of deposition may be carried out continuously, directly on the ribbon of hot glass in a float line; it is then only a question of aligning as many precursor spray nozzles as layers to be deposited on the line in order to obtain the desired stack. However, it is not excluded from the scope of the invention to deposit only the final layer or the "n" final layers of the stack by pyrolysis and to deposit the first layer or layers using another deposition technique. This other technique may, for example, be a vacuum technique of the sputtering type or a technique of the sol-gel type. It is also not excluded to deposit another layer of the stack, especially the first layer or layers, by pyrolysis, and to deposit the final layer or layers using another deposition technique.

This other technique may, for example, be also a vacuum technique.

As mentioned above, a partial antireflection effect may be obtained by using only a single anti-reflection coating per glazing pane. However, it is known that the optimum effect is obtained by providing the glazing pane not with one antireflection coating but with two, one on each of its external faces (therefore on the faces 1 and 2 if this is a glazing pane composed of a single substrate or on the faces 1 and 4 if this is a multiple glazing pane of the laminated glazing pane type having two glass substrates).

Several choices therefore present themselves within the invention in order to obtain this optimum antireflection effect:

it is in particular possible to provide the other external face of the glazing pane pane with an "A'" antireflection coating similar or even identical to the "A" coating, therefore also having at least one pyrolysed layer, especially at least the final one. Thus, when the glazing pane has a laminated structure, it is then simply a question of joining together, using a sheet of polymer, two substrates each provided with an "A"-type stack, the two stacks both having been able to be manufactured directly on the ribbon of float glass.

If the glazing pane is monolithic, the "A" first stack may be obtained on float, and the second in a subsequent operation, either also using pyrolysis or using another technique such as sputtering or the sol-gel technique (by masking the antireflection coating already deposited).

It is also possible to provide the other face of the glazing pane with an antireflection coating denoted hereafter by the term "B" coating, which also comprises a stack of layers of materials having alternately high and low refractive indices, but which are deposited using a vacuum technique such as sputtering. Providing a nonpyrolysed second antireflection stack may in fact have certain advantages: when the glazing pane is termed monolithic, composed only of a single glass substrate, it may be advantageous to deposit the "A"-type first antireflection coating continuously on the ribbon of float glass and then to deposit the "B"-type second antireflection coating by vacuum deposition in a subsequent operation without reheating the substrate. It may be worth pointing out that in this situation the excellent mechanical durability of the "A" antireflection stack is highly advantageous: the substrate may be moved along a vacuum deposition line on conveyor rollers, with the stack being in contact with the rollers, without being damaged despite the inevitable rubbing between substrate and rollers. Moreover, one of the two external faces of the glazing pane, in general the face turned towards the inside of the room in the case of building glazing pane or towards the inside of the passenger compartment in the case of a vehicle window, is often less stressed chemically or mechanically: it is therefore possible "to take the liberty" of using a "B" antireflection stack which has an inferior durability to that of an "A"-type stack but which nevertheless may be sufficient.

As examples of "B"-type antireflection stacks capable of being deposited using a vacuum technique, reference may advantageously be made to the European Patent Application filed on Feb. 22, 1996 under the number 96/400367.7, corresponding to French Patent Application 95/02102, which describes an antireflection coating furthermore having the beneficial feature of being able to undergo, without deterioration, heat treatments of the carrier substrate of the bending/tempering or annealing type: this involves especially "isolating" from the substrate the layers likely to degrade at high temperature due to migration of alkaline components from the glass (such as $Nb_2O_5$, $WO_3$, $Bi_2O_3$ or $CeO_2$) using a "barrier" layer forming part of the stack, especially a low-index layer of the $SiO_2$ or $F:Al_2O_3$ type or a mixture of these two compounds, or else a high-index layer such as $Si_3N_4$ or AlN, or else a layer having an intermediate index, especially one based on an Si and Sn, Si and Zn or Si and Ti oxide mixture, or else based on $SiO_xN_y$.

Reference may also advantageously be made to the French Patent Application filed on Feb. 22, 1996 under the number 96/02194, describing an antireflection coating which is also capable of being deposited by a vacuum technique and using low-index layers of the aluminium fluoride or aluminium oxyfluoride $Al_xO_yF_z$, where $y \geq 0$, type.

In general, the so-called low-index layers usually deposited by vacuum techniques are chosen from, for example, $SiO_2$ and $MgF_2$ and the so-called high-index layers from, for example, $Ta_2O_5$, $TiO_2$, $Nb_2O_5$, $ZrO_2$, $SnO_2$, ZnO and $WO_3$.

Preferably, "A"-type antireflection coatings according to the invention (and also, optionally, the "B"-type antireflection coatings which are associated therewith) are designed so that, on the one hand, the so-called low-index layers have a refractive index of between 1.35 and 1.70, preferably between 1.38 and 1.65, and, on the other hand, the so-called high-index layers have a refractive index of at least 1.85, especially of between 1.90 and 2.60, preferably between 2.10 and 2.45. The antireflection effect is in fact fully realized only if there is a significant difference in refractive indices between the high-index and low-index layers in contact with each other.

According to one particular embodiment of the invention, the first "high-index layer/low-index layer" sequence of layers in the "A" antireflection coating (and optionally also in the "B"-type antireflection coating when it is used) is replaced by a single so-called "intermediate" index layer, especially having an index of between 1.70 and 1.85—such a layer has an optical effect very similar to a high-index/low-index sequence. The material capable of exhibiting such an index may be chosen based on tin oxide, silicon oxynitride and/or oxycarbide, $SiO_xC_y$ and/or $SiO_xN_y$, or based on a mixture of oxides, for example a mixture of silicon oxide and tin oxide, of silicon oxide and zinc oxide or of silicon oxide and titanium oxide, the relative proportion of the two types of oxides enabling the refractive index to be adjusted to the desired value.

In order to produce the "A" antireflection coating according to the invention, it is preferable to choose pyrolysed layers having a low refractive index which consist of a dielectric material or a mixture of dielectric materials chosen from the group comprising silicon oxide, silicon oxynitride and/or silicon oxycarbide, $SiO_xN_y$ and/or $SiO_xC_y$, or else a mixed silicon aluminium oxide which also contains at least one third element M facilitating the formation of a homogeneous mixed-oxide structure. This element M is especially a halogen of the fluorine type and the layer may also contain a fourth element, especially carbon. For more details regarding the composition of this mixed oxide, reference may advantageously be made to French Patent Application FR-A-2 727 107 corresponding to European Application 95/402612.6, which also describes its preferred method of obtaining it, which is a CVD technique. This layer is preferably used in the invention to form the low-index final layer of the antireflection coating since this layer has proved to be extremely resistant.

The choice of high-index pyrolysed layers may advantageously rely on dielectric materials or mixtures of dielectric materials belonging to the group comprising $TiO_2$, $SnO_2$, ZnO, $ZrO_2$ or $Ta_2O_5$.

As mentioned previously, the glazing pane of the invention may be composed of a single anti-reflection coating on one of its faces, especially on the face 1, and either an "A'" coating of the same type or a "B" coating on the opposite face, especially the face 2. In the case of a standard laminated glazing pane, with two glass substrates joined together by a sheet of polymer material of the PVB (polyvinylbutyral) type, this preferably has on one of its faces, especially the face 1, an "A" coating and on the other external face, especially the face 4 either an "A'" coating of the same type or a "B" type coating.

Moreover, it may be noted that the anti-reflection coatings according to the invention may also be applied to so-called asymmetric laminated glazing panes, comprising at least one glass substrate and at least one sheet of polymer exhibiting energy-absorbing properties, such as polyurethane.

The choice of the nature of the constituent glass substrate or substrates of the glazing pane may also prove to be important: it is possible to combine the optical and/or thermal properties intrinsic to the glass substrate(s) with the optical properties of the antireflection coating(s) in order to obtain a glazing pane having overall the desired performance characteristics.

Thus, the substrates may be chosen from clear glass, for example those sold under the trade name Planilux by the company Saint-Gobain Vitrage. The additional effect of increasing the light transmission, due to the antireflection coating(s) therefore enables extremely transparent glazing panes to be obtained.

However, it is also possible to choose the substrates making up the glazing panes from glass exhibiting reduced energy transmission properties, especially bulk-tinted glasses. At the cost of a certain reduction in the light transmission, useful solar protection glazing pane is obtained, the effect of increasing the light transmission obtained by virtue of the antireflection coating(s) advantageously enabling this reduction in the level of transparency to be moderated. Bulk-tinted glazing pane, especially suitable for buildings, is for example sold under the name "Parsol" by the company Saint-Gobain Vitrage. Other types of glass having reduced energy transmission are also advantageous within the scope of the present invention.

These are especially bronze-coloured glasses, as described in U.S. Pat. Nos. 4,190,542 and 4,101,705, or glasses whose composition has been adjusted more from the standpoint of a motor-vehicle glazing pane application. These involve, for example, glasses called TSA$^+$ or TSA$^{++}$ in which the content of colouring oxides of the $Fe_2O_3$, FeO and CoO type are adjusted so as to have a selectivity defined by the $T_L/T_E$ ratio of at least 1.30, or even 1.40 to 1.50, and a tint in the greens. Reference may advantageously be made for more detail to European Patent Application EP-A-0 616 883. The content of the aforementioned colouring oxides in the glass compositions according to the teaching of this patent (in weight proportions) are briefly recalled below.

According to a first series:

| | |
|---|---|
| $Fe_2O_3$ | 0.55 to 0.62% |
| FeO | 0.11 to 0.16% |
| CoO | 0 to 12 ppm, especially <12 ppm, | especially with an $Fe^{2+}/Fe$ ratio of about 0.19 to 0.25.

According to a second series:

| | |
|---|---|
| $Fe_2O_3$ | 0.75 to 0.90% |
| FeO | 0.15 to 0.22% |
| CoO | 0 to 17 ppm, especially <10 ppm, | especially with an $Fe^{2+}/Fe$ ratio of about 0.20.

These may also be bulk-tinted glasses, especially those tinted in the blue-green such as are described in Patent Application EP-A-0 644 164, the composition of which is recalled hereinbelow:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ | 0.75 to 1.4% |
| (total iron expressed in this form) | |
| FeO | 0.25 to 0.32% |
| $SO_3$ | 0.10 to 0.35% |

These may also be glasses such as those described in the PCT application filed under the number PCT/FR95/00828 on Jun. 22, 1995, corresponding to Application FR-A-2 721 599, the composition of which, still in percentages by weight, is recalled hereinbelow:

| | |
|---|---|
| $SiO_2$ | 69 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 17% |
| $K_2O$ | 0 to 8% |
| $Fe_2O_3$ (total iron) | 0.2 to 4% |
| Se, CoO, $Cr_2O_3$, NiO, CuO | 0 to 0.45% | the content of colouring agents other than iron being at least equal to 0.0002% when the $Fe_2O_3$ content is equal to or less than 1.5%, this composition being also liable to contain fluorine, zinc oxide, zirconium oxide, cerium oxide, titanium oxide and less than 4% of barium oxide, the sum of the percentages of the alkaline-earth metal oxides remaining equal to or less than 10%.

Still according to the teaching of this patent, it is preferred that the colouring agents other than iron be introduced into the glass composition, alone or in combination, in weight contents which preferably remain less than the following limits:

| | | |
|---|---|---|
| Se | < | 0.008% |
| CoO | < | 0.04% |
| $Cr_2O_3$ | < | 0.1% |
| NiO | < | 0.07% |
| CuO | < | 0.3%. |

They may also be glasses such as those described in Application PCT/FR96/00394 filed on Mar. 14, 1996 and corresponding to the French Patent Application filed on Mar. 16, 1995 under the number 95/03858, which glasses comprise, expressed in percentages by weight, from 0.85 to 2% of total iron, expressed in the form $Fe_2O_3$, the weight content of FeO being between 0.21 and 0.40%.

According to this patent, the compositions are, according to a first series, as follows:

| | |
|---|---|
| $SiO_2$ | 64 to 75% |
| $Al_2O_3$ | 0 to 5% |
| $B_2O_3$ | 0 to 5% |

-continued

| | |
|---|---|
| CaO | 2 to 15% |
| MgO | 0 to 5% |
| Na$_2$O | 9 to 18% |
| K$_2$O | 0 to 5% |
| Fe$_2$O$_3$ (total iron expressed in this form) | 0.85 to 2% |
| FeO | 0.21 to 0.40% |
| CoO, Cr$_2$O$_3$, Se, TiO$_2$, MnO, NiO, CuO | 0 to 0.04% |
| SO$_3$ | 0.08 to 0.35% | and according to a second series, as follows:

| | |
|---|---|
| SiO$_2$ | 68 to 75% |
| Al$_2$O$_3$ | 0 to 3% |
| B$_2$O$_3$ | 0 to 5% |
| CaO | 2 to 10% |
| MgO | 0 to 2% |
| Na$_2$O | 9 to 18% |
| K$_2$O | 0 to 8% |
| Fe$_2$O$_3$ (total iron expressed in this form) | 0.95 to 2% |
| CoO, Cr$_2$O$_3$, Se, TiO$_2$, MnO, NiO, CuO | 0 to 0.04% |
| FeO | 0.29 to 0.04% |
| SO$_3$ | 0.08 to 0.35% |

All these tinted-glass composition types may therefore advantageously be chosen so that the glazing panes exhibit energy transmission values of between 30 and 70%, especially between 35 and 60% and light transmission values of between 50 and 85%.

The glass substrates carrying the antireflection stack or stacks may undergo various heat treatments, especially bending, tempering or annealing. There are two particular cases: either the coatings are deposited after treatment, which prevents the layers from being deposited in the float line (and which is difficult in the case of "A" coatings whose deposition requires the glass to be reheated) or the coatings, at the very least the "A"-type coatings, are deposited in line and designed to be capable of undergoing these treatments without their optical properties being adversely affected. In the case of the "B"-type stacks, a configuration exhibiting this kind of property has already been mentioned above.

The glazing panes may also include at least one other type of thin layer or stack of thin layers having a solar protection function. These may be reflecting layers such as sufficiently thick silver-based layers. They may thus be stacks of the dielectric/silver/dielectric type or of the dielectric/silver/dielectric/silver/dielectric type. For more details on these types of stacks reference may be made to European Patent Applications EP-A-0 678 484, EP-A-0 645 352 and EP-A-0 638 528. Stacks comprising a reflecting and/or filtering layer such as a layer of nitride, for example titanium nitride, as described in Applications EP-A-0 638 527 and EP-A-0 650 938, may also be used.

It is also possible to provide glazing panes according to the invention with at least one electrically conductive coating having an alarm function: it may consist of a conducting layer or of an array of conductive wires, which are for example screen-printed using a conductive silver paste, which will be connected to a current source by ad hoc leads. Should an attempt be made to break the glazing pane, if the current no longer flows, means will trigger an audible and/or visible alarm.

In fact, a choice will rather be made either to use tinted glass or to use this type of solar protection coating, but in both cases it is worth combining their thermal and optical properties, which are correlated, with the optical properties of the antireflection coating(s) in order to obtain the desired glazing pane.

A preferred configuration of laminated glazing pane consists in providing at least one of the internal faces of the glass substrates of which it is composed, that is to say the faces 2 and/or 3, with coatings having a solar protection function and/or having an alarm function.

The "A" antireflection coating (and/or optionally the "B" antireflection coating) of the glazing panes according to the invention may be further functionalized by covering it with a coating having photocatalytic properties and having an antisoiling function, especially a coating based on at least partially crystallized titanium oxide which may be obtained by CVD, as described in the French Patent Application filed on Sep. 15, 1995 under the number FR-95/10839.

In the same vein, it is also possible to treat the surface of the final pyrolysed layer of the "A"-type antireflection stack with silanes, especially using the trickling technique so as to decrease its co-efficient of friction and thus, especially in order to facilitate the sweeping action of the wipers in the case of a windscreen for example.

Especially in the case in which it is envisaged to use the glazing panes as interior or exterior windows for buildings, shop windows, shop counters or as windows for vehicles of the automobile type other than the windscreen (side windows, rear windows, sunshine roof), the optical thicknesses of the layers making up the antireflection stack or stacks may be advantageously chosen so as to reduce the light reflection of the glazing pane to values of less than 1.5%, especially less than 1.0%, at normal incidence. This is in fact generally the performance level expected of antireflection glazing pane.

In order to obtain such values of light reflection, the "A" antireflection stacks according to the invention may comprise, starting from the layer lying closest to the substrate:

two layers including:
  a high-index first layer having an optical thickness of between 15 and 50 nm, especially between 20 and 40 nm,
  and a low-index second layer having an optical thickness of between 160 and 200 nm, especially between 170 and 190 nm, three layers including:
  an intermediate-index first layer having an optical thickness of between 100 and 140 nm, especially between 110 and 130 nm,
  a high-index second layer having an optical thickness of between 210 and 260 nm, especially between 230 and 250 nm,
  and finally a low-index third layer having an optical thickness of between 100 and 150 nm, especially between 110 and 140 nm.

In particular in the case in which it is envisaged to use the glazing pane as a windscreen, especially a laminated one, for a vehicle of the automobile or train type, the selection of the optical thicknesses of the layers of the antireflection stacks may be slightly different since the criteria will vary: this is because current windscreens are highly inclined, while optimization of the light reflection taking into account only measurements at normal incidence proves to be insufficient. Furthermore, windscreens must reconcile two properties, that is to say exhibit at the same time a very high light transmission in respect of security problems (the current standards impose a value of $T_L$ of at least 75% at normal incidence) and an energy transmission as small as possible, in order to avoid excessive heating of the passenger compartment in summer: for the specific application of windscreens, it is therefore necessary to seek in fact to adjust the selectivity $T_L/T_E$ to as high a value as possible. For the windscreen application, optical thicknesses of the layers are therefore chosen which together make it possible to obtain an $R_L$ value of less than 7% and even less than 6% at normal incidence, less than 10% at 60° incidence, a value of $T_L$ at normal incidence of at least 75% and a selectivity $T_L/T_E$ of at least 1.65, especially at least 1.70.

In order to meet all these criteria, the "A" antireflection coating(s) of the invention may advantageously comprise three layers, including, starting from the layer closest to the substrate:

an intermediate-index first layer having an optical thickness of between 160 and 210 nm, especially between 180 and 200 nm, a high-index second layer having an optical thickness of between 300 and 350 nm, especially between 320 and 340 nm, and a low-index third layer having an optical thickness of between 120 and 170 nm, especially between 145 and 165 nm.

A further subject-matter of the invention is the use of the glazing panes described above for applications other than building or the vehicles already envisaged, especially applications as glazing panes for protecting objects of the picture type, for an antiglare protection screen for a computer, for decorative glass, for glass furniture or for a mirror (an opacifying layer being, for example, added to it).

The glazing panes coated with antireflection coating according to the invention may also be designed and mounted so as to be able to fulfil a fire-protection function having flame-barrier properties: reference may advantageously be made, for example, to Patent Application EP-A-0 635 617 or to Patent Application EP-A-0 568 458. They may also exhibit fire-break properties, and are then usually composed of two glass substrates mounted in a frame at a certain distance apart, the space separating them being filled with an aqueous gel, as described in Patent EP-B-442 768 or U.S. Pat. No. 4,983,464.

Figure 3:
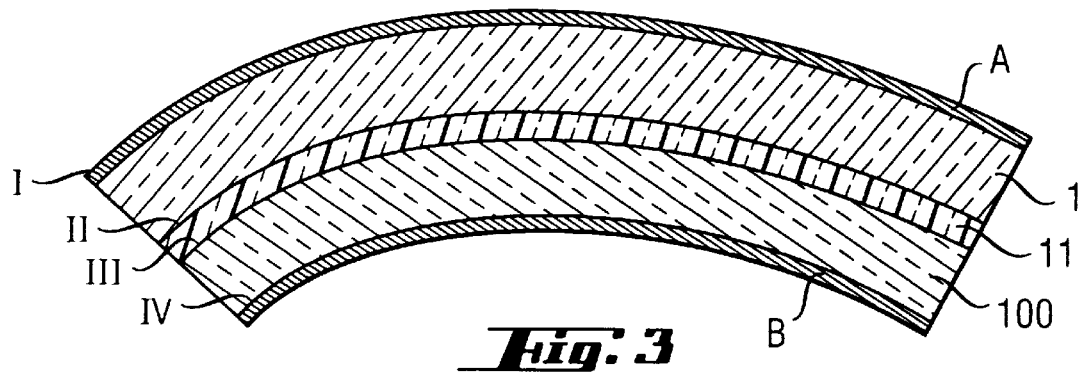

The details and advantageous characteristics of the invention will now emerge from the following nonlimiting examples, with the aid of the appended figures:

FIG. 1: a substrate provided with a two-layer antireflection stack (1a), with a three-layer antireflection stack (1b) and with a four-layer antireflection stack (1c), FIG. 2: a monolithic glazing pane provided with two antireflection stacks, FIG. 3: a laminated glazing pane provided with two antireflection stacks.

FIG. 1, which is highly diagrammatic, shows, in section, a glass substrate covered with an "A" pyrolysed antireflection coating according to three variants (the proportions between the thickness of the various layers making up the antireflection coating and that of the substrate have not been respected in order to make them easier to appreciate). A single stack has been shown, even though, as described in FIGS. 2 and 3, a second antireflection stack, whether pyrolysed or not, may be deposited on the substrate on its opposite face.

According to the variant in FIG. 1a, a glass substrate 1 is shown which is provided with a two-layer coating A1 comprising a high-index first layer 2 covered by a low-index second layer 3. According to the variant in FIG. 1b, the same substrate 1 is provided with a three-layer coating A2 comprising an intermediate-index first layer 4 covered by a high-index second layer 5 and by a low-index third layer 6. According to the variant in FIG. 1c, the same substrate 1 is provided with a four-layer coating A3 comprising an alternation of two high-index layers 7, 9 and two low-index layers 8, 10.

In all the following examples, the layers of the coatings A1, A2 or A3 are obtained using a pyrolysis technique in liquid, pulverulent or gas phase directly on the ribbon of float glass.

Indicated below, non-exhaustively, are the suitable precursors for obtaining the oxide layers with the desired index:

the low-index layers of the silica type are deposited by CVD using tetraorthosilicate TEOS or $SiH_4$, the low-index layers of the optionally fluorinated mixed silicon aluminium oxide type are deposited by CVD using a mixture of a silicon pre-cursor, such as TEOS, and an aluminium precursor in the form of an organometallic containing an alkoxide or β-diketone function of the optionally fluorinated acetylacetonate or 2-methyl-4,6-heptadione type (fluorinated aluminium precursors are chosen especially from hexafluorinated aluminium acetylacetonate or an aluminium trifluoroacetylacetonate, as described in the aforementioned Application FR-A-2 727 107, the intermediate-index layers of the silicon oxycarbide $SiO_xC_y$ type are also deposited by CVD using ethylene and $SiH_4$, in accordance with Patent Application EP-A-0,518,755, the high-index layers based on tin oxide are deposited by powder pyrolysis of dibutyltin difluoride (DBTF) or by CVD using tin tetrachloride, the high-index layers based on $TiO_2$ are deposited by liquid pyrolysis using a mixture of titanium alkoxide and titanium chelate in a solvent of the ethyl acetate type (precursors described in Patent EP-B-0 465 309) or by CVD using tetraisopropyl titanate, or alternatively by powder pyrolysis using methyl ethyl titanate or $Ti(OCH_3)_4$. The details of the deposition conditions for each of these layers will not be given since they are known to those skilled in the art. For the vacuum-deposited antireflection coatings, details may especially be found in the aforementioned European Patent Application 96/400367.7.

FIG. 2 illustrates the configuration of a glazing pane according to a first Example 1: this is a so-called monolithic glazing pane consisting only of a single glass substrate provided on its face 1 with an "A" antireflection stack and on its face 2 with a "B" antireflection stack consisting of thin layers obtained by sputtering. The substrate 1 is shown flat, but it may also be curved with a variable radius of curvature. The face 1 is generally turned towards the outside, which then corresponds, in the case of bending, to the convex face (the face 2 being concave).

EXAMPLE 1

Deposited in a float line on a 4 mm thick ribbon of glass of the soda-lime silica glass type (sold, once cut, under the name Planilux by the company Saint-Gobain Vitrage) is a first pyrolysed stack A2 comprising (cf. FIG. 1b):

a first layer based on $SiO_xC_y$ having a refractive index of approximately 1.73 and a geometrical thickness of 71 nm, a second layer based on $TiO_2$ having a refractive index of 2.45 and a geometrical thickness of 99 nm, a low-index third layer based on a mixed oxide SiOAlF, having a refractive index of 1.48 and a geometrical thickness of 90 nm.

After cutting the ribbon, a "B" antireflection coating is deposited on the other face by reactive sputtering in the presence of oxygen, this coating comprising:

a first layer of $SnO_2$ having a geometrical thickness of 18 nm and an index of 1.9, a second layer of $SiO_2$ having a geometrical thickness of 35 nm and an index of 1.45, a third layer of $Nb_2O_5$ having a geometrical thickness of 120 nm and an index of 2.1, a fourth layer of $SiO_2$ having a geometrical thickness of 85 nm and an index of 1.45.

Table 1 below collates, for the substrate thus coated and, by way of comparison, for a substrate which is identical but devoid of any coating, the following spectrophotometric values measured under the $D_{65}$ illuminant:

$T_L$ the percentage light transmission at normal incidence $T_E$ the percentage energy transmission at normal incidence $R_L$ the percentage light reflection at normal incidence $a*–b*$ the colour values in reflection according to the dimensionless colorimetry system ($L*$, $a*$, $b*$), $T_L/T_E$ the dimensionless selectivity

TABLE 1

|  | EXAMPLE 1 | COMPARATIVE EXAMPLE |
|---|---|---|
| $T_L$ | 95 | 89 |
| $T_E$ | 79 | 83 |
| $R_L$ | 0.7 | 7.9 |
| $a*$ | 3.3 | −0.2 |
| $b*$ | −17.5 | −0.5 |
| $T_L/T_E$ | 1.2 | 1.07 |

From these results it is therefore seen that the gain in $T_L$ and in selectivity is highly significant and that the value of $R_L$ of the coated substrate is less than 1%. The substrate is therefore very suitable for a building application.

A second series of examples, 2 to 10, corresponds to glazing pane having the laminated configuration shown in FIG. 3: the previous substrate 1 is joined to a second glass substrate 10 using a 0.7 mm thick sheet 11 of PVB. This second substrate is also provided on its external face with an antireflection stack which is either pyrolysed and identical to that with which the substrate 1 is coated or is vacuum-deposited and of the "B" type.

Examples 2 to 5 use two 4 mm thick Planilux glass substrates 1, 10.

EXAMPLE 2

The two antireflection stacks of the substrates 1 and 10 are identical and all their layers are pyrolysed. These are two-layer stacks (cf. FIG. 1a) comprising:

a first layer of $TiO_2$ having a geometrical thickness of 12 nm a second layer of mixed oxide, $SiOAlF_x$, identical to that in Example 1, having a geometrical thickness of 124 nm.

EXAMPLE 3

The two antireflection stacks of the substrates 1 and 10 are identical and all their layers are pyrolysed. These are also two-layer stacks comprising:

a first layer of $SnO_2$ having a geometrical thickness of 95 nm a second layer of $SiOAlF_x$, identical to that in the previous examples, having a geometrical thickness of 92 nm.

EXAMPLE 4

The two antireflection stacks of the substrates 1 and 10 are identical and all their layers are pyrolysed. These are three-layer stacks (cf. FIG. 1b) having structures and thicknesses of the layers identical to those in Example 1.

EXAMPLE 5

The two antireflection stacks are different: that of the substrate 1 is a two-layer stack according to Example 2, that of the substrate 10 is a vacuum-deposited "B"-type stack identical to that described in Example 1.

Table 2 below collates all the spectrophotometric values already explained in the case of Examples 2 to 4 with, by way of comparison, the values for a laminate consisting of the two same glass substrates joined together but having no coating.

TABLE 2

|  | EX. 2 | EX. 3 | EX. 4 | EX. 5 | COMPARATIVE |
|---|---|---|---|---|---|
| $T_L$ | 96 | 95 | 97 | 95 | 86 |
| $T_E$ | 84 | 83 | 78 | 79 | 72 |
| $R_L$ | 0.9 | 1.3 | 0.4 | 1.1 | 7.6 |
| $a*$ | 44 | 17.1 | 0.7 | 19.7 | −1.0 |
| $b*$ | −40 | −36.7 | 3 | −25.4 | 0.1 |
| $T_L/T_E$ | 1.14 | 1.14 | 1.24 | 1.20 | 1.18 |

In this table, it may be seen that all the examples of the invention, even those with simply two-layer stacks, make it possible to achieve particularly low values of $R_L$ of at most 1.3%.

It may also be noted that there is a significant gain in selectivity in the case of Examples 4 and 5 compared with the Comparative Example and a residual value in reflection which is particularly low in the case of Example 4.

Examples 6 to 10 use a 4 mm clear substrate 10 identical to that used in Examples 2 to 5, but a 4 mm substrate 1 which is bulk-tinted, having a reduced $T_E$.

EXAMPLE 6

The antireflection stacks are pyrolysed three-layer stacks identical to those in Example 4. The glass of substrate 1 is in accordance with the teaching of the aforementioned Patent EP-A-0,644,164. Its composition is as follows (in percentages by weight):

| $SiO_2$ | 70.75% |
|---|---|
| $Al_2O_3$ | 0.62% |
| CaO | 9.50% |
| MgO | 3.90% |
| $Na_2O$ | 13.90% |
| $K_2O$ | 0.09% |
| $SO_3$ | 0.18% |
| $Fe_2O_3$ (total iron) | 0.95% |
| FeO | 0.285% |
| FeO (total iron) | 0.30% |

Taken alone, but with neither coating nor in a laminated construction, it has a $T_L$ of 71%, a $T_E$ of 43.5% and a $T_{UV}$ of 18%.

COMPARATIVE EXAMPLE 6

This allows comparison with Example 6, the substrates being the same but devoid of any coating.

EXAMPLE 7

The antireflection stacks are pyrolysed three-layer stacks identical to those of Example 4. The glass of the substrate 1 has a thickness of 4 mm and is in accordance with the teaching of the aforementioned Patent Application PCT/FR95/00828. The MgO, Fe$_2$O$_3$ and FeO contents of the glass are as follows (in percentages by weight):

| | |
|---|---|
| MgO | 0.3% |
| Fe$_2$O$_3$ | 0.20% |
| FeO | 0.36% |

Taken alone, with neither coating nor in a laminated construction, it has a $T_L$ of 81%, a $T_E$ of 60% and a $T_{UV}$ of 51%.

COMPARATIVE EXAMPLE 7

This allows comparison with Example 7, the substrates being the same but devoid of any coating.

Table 3 below collates all the spectrophotometric values corresponding to Example 6, Comparative Example 6, Example 7 and Comparative Example 7:

TABLE 3

| | EX. 6 | COMPARATIVE EX. 6 | EX. 7 | COMPARATIVE EX. 7 |
|---|---|---|---|---|
| $T_L$ | 73 | 67 | 88 | 81 |
| $T_E$ | 37 | 37 | 58 | 60 |
| $R_L$ | 0.3 | 6.5 | 0.4 | 7.8 |
| a* | −1 | −3.3 | −0.5 | −1.5 |
| b* | −1.8 | −0.8 | −1.5 | −0.6 |
| $T_L/T_E$ | 1.94 | 1.8 | 1.52 | 1.35 |

Here too, it is found that in the examples in accordance with the invention there is a net gain in selectivity, with $R_L$ values of less than 0.5% and very weak residual colorations in reflection.

The final series of examples, 8 to 10, is aimed more particularly at a laminated windscreen application for automobiles: the two substrates 1, 10 are firstly provided with their stacks directly on the float line and then, after cutting, are curved, the substrate 1 having its external face 1 convex and the substrate 10 having its external face 4 concave.

The substrate 1 has a thickness of 2.6 mm and is solidly tinted. The substrate 10 has a thickness of 2.1 mm and is untinted, of the Planilux type. The sheet 11 of PVB again has a thickness of 0.7 mm.

EXAMPLE 8

The substrate 1 has a composition in accordance with Patent EP-0 644 164, more precisely the following composition (in proportions by weight):

| | |
|---|---|
| SiO$_2$ | 70.8% |
| Al$_2$O$_3$ | 0.6% |
| Na$_2$O | 13.8% |
| K$_2$O | 0.10% |
| CaO | 9.50% |
| MgO | 4.10% |
| Fe$_2$O$_3$ (total iron expressed in this form) | 0.86% |
| TiO$_2$ | 0.035% |
| SO$_3$ | 0.17% |
| FeO | 0.28% |

The two antireflection stacks are pyrolysed, identical and in the form of a three-layer stack (cf. FIG. 1b) with:

a first layer based on SiO$_x$C$_y$ having an index of 1.83 and a geometrical thickness of 105 nm a second layer based on TiO$_2$ having a geometrical thickness of 135 nm a third layer made of SiOAlF$_x$, as previously defined, having an index of 1.48 and a geometrical thickness of 107 nm.

COMPARATIVE EXAMPLE 8

This uses the same substrates as Example 8, but having no antireflection coatings.

EXAMPLE 9

The only difference from Example 8 is that the substrate 1 is further coloured and still complies with the teaching of Patent EP-0 644 164 with the composition identical to that indicated in the case of Example 6.

COMPARATIVE EXAMPLE 9

This uses the same laminated construction of the substrates identical to Example 9, but without any antireflection coating.

Table 4 below collates the spectrophotometric values already explained, this time measured as a function of the "A" illuminant. Also specified are the values of $T_L$, $T_E$, $R_L$, a* and b* at 60° incidence:

TABLE 4

| | EX. 8 | COMPARATIVE EX. 8 | EX. 9 | COMPARATIVE EX. 9 |
|---|---|---|---|---|
| $T_L$ | 81 | 76 | 76 | 71 |
| $T_E$ | 47 | 48 | 44 | 44 |
| $R_L$ | 1.9 | 7 | 1.5 | 6.7 |
| a* | 57.8 | −2.6 | 8.9 | −3.1 |
| b* | −73.6 | 0.1 | −45.7 | −1.1 |
| $T_L/T_E$ | 1.72 | 1.57 | 1.7 | 1.61 |
| $T_L$ (60°) | 73 | 66 | 68 | 61 |
| $T_E$ (60°) | 39 | 39 | 37 | 35 |
| $R_L$ (60°) | 6.7 | 13 | 5.1 | 12.7 |
| a* (60°) | 5 | −3.1 | 2.4 | −3.3 |
| b* (60°) | −17.3 | 0.3 | −5.9 | −0.9 |

In this table, it may be observed that the selection of the thicknesses of the layers of the stacks has been modified compared to the previous series so as to improve the antireflection effect at oblique incidence by increasing the value of $T_L$ significantly, both at normal incidence and at 60°. The gain in selectivity obtained with the invention is most particularly advantageous in the vehicle field in order to decrease the heating of the passenger compartments. It may be seen from Table 4 that it is possible, by virtue of the invention, to exceed the 1.8 bar in the case of selectivity at oblique incidence. Furthermore, the gain in $T_L$ obtained by the stacks according to the invention makes it possible to use low-energy-transmission substrates which hitherto could not be used because they reduced the value of $T_L$ of the laminate below the 75% threshold value imposed by the standards: referring to Example 9 and Comparative Example 9, it may be seen that these are antireflection stacks which enable the glazing pane to exceed this 75% limit of $T_L$ at normal incidence: the invention therefore permits the use as windscreens of quite highly coloured glazing pane, which here too tends to reduce the heating of passenger compartments without being excessively penalized in terms of transparency.

A final example, 10, was produced, this being similar to Example 8.

The only difference resides in the anti-reflection stack deposited on the face 1 of the substrate 1: the three-layer stack comprises an SiOC first layer having an index of 1.83 and a geometrical thickness of 102 nm, a TiO$_2$ second layer of 115 nm, a third layer of SiOAlF$_x$ having a geometrical thickness of 80 nm and an index of 1.48 and, in addition, a final thin layer of 10 nm of TiO$_2$ deposited by CVD and partially crystallized, as described in the aforementioned Application FR-95/10839: an additional antisoiling functionality is thus conferred on the windscreen without significantly penalizing its antireflection function, since the fourth layer, of relatively high index, is limited to a low thickness (especially at most 20 nm).

Table 5 below collates the spectrophotometric values of such a glazing pane at normal incidence and at 60° incidence:

TABLE 5

|  | EX. 10 |
|---|---|
| $T_L$ | 77 |
| $T_E$ | 46 |
| $R_L$ | 6 |
| a* | 21.3 |
| b* | −40.9 |
| $T_L/T_E$ | 1.68 |
| $T_L$ (60°) | 72 |
| $T_E$ (60°) | 40 |
| $R_L$ (60°) | 8 |
| a* (60°) | −7 |
| b* (60°) | −12.4 |

Finally, it should be noted that the pyrolysed stacks according to the invention of all the above examples give excellent results in terms of durability, with especially an endurance to the neutral saline mist test, according to Standard ISO 9227, of at least 21 days and a $T_L$ variation of at most 3% when they are subjected to an abrasion test called the Taber test performing 2000 rotations (this test is carried out using an abrasive powder embedded in an elastomer, using a machine manufactured by the company Taber Instrument Corp., which machine bears the reference "Standard Abrasion Tester", Model 174, the grinding wheels being of the S10F type and loaded with 500 grams).

We claim:

1. A glazing pane, comprising:
    an "A" antireflection coating on at least a first external face thereof and an "A'" antireflection coating on a second external face thereof, wherein each of the "A" and "A'" antireflection coatings consist essentially of a stack of layers of materials having alternately high and low refractive indices, and
    wherein at least some of the layers of each of the stacks are pyrolyzed layers,
    wherein the low-refractive-index layers have a refractive index between 1.35 and 1.70;
    and wherein the high-refractive-index layers have a refractive index of at least 1.85.

2. The glazing pane according to claim 1, characterized in that a first layer of each stack is pyrolyzed and a final layer or layers of each stack are vacuum-deposited.

3. The glazing pane according to claim 1, characterized in that all the layers of the stack are pyrolyzed layers on a glass substrate (1, 10).

4. The glazing pane according to claim 1, characterized in that the low-refractive-index layers (3, 6, 8, 10) in the said antireflection stack(s) have an index of between 1.38 and 1.65.

5. The glazing pane according to claim 1, characterized in that in at least one of the "A" or "A'" antireflection coating (s), a first "high-index layer/low-index layer" sequence (7, 8) of layers is replaced by an intermediate-index layer (4) having an index of between 1.70 and 1.85 and which is optionally a layer based a material selected from the group consisting of silicon oxynitride, silicon oxycarbide, SiO$_x$N$_y$, SiO$_x$C$_y$, tin oxide, and mixtures thereof.

6. The glazing pane according to claim 1, characterized in that the pyrolyzed low-refractive-index layers (3, 6, 8, 10) are made of a dielectric material or a mixture of dielectric materials selected from the group consisting of silicon oxide SiO$_2$, silicon oxynitride, silicon oxycarbide SiO$_x$N$_y$, SiO$_x$C$_y$, and an optionally halogenated mixed silicon aluminum oxide having the formula SiAl$_x$O$_y$F$_z$, and mixtures thereof.

7. The glazing pane according to claim 1, characterized in that the pyrolyzed high-refractive-index layers (2, 5, 7, 9) are made of a dielectric material or a mixture of dielectric materials selected from the group consisting of TiO$_2$, SnO$_2$, ZnO, ZrO$_2$ and Ta$_2$O$_5$.

8. The glazing pane according to claim 1, further comprising a single glass substrate (1).

9. The glazing pane according to claim 1, comprising a structure selected from the group consisting of:
    a laminated structure, comprising at least two glass substrates (1, 10) joined together by means of a sheet (11) of polymer material, wherein the polymer material is optionally PVB, and
    an asymmetric laminated structure comprising a glass substrate and at least one sheet of polymer, wherein the polymer is optionally polyurethane.

10. The glazing pane according to claim 1, further comprising at least one glass substrate (1, 10) made of a glass material selected from the group consisting of clear glass, glass having a reduced energy transmission, bulk-tinted glass, and glass having a light transmission $T_L$ of between 50 and 85% and an energy transmission $T_E$ of between 30 and 70%.

11. The glazing pane according to claim 1, further comprising at least one glass substrate that is curved and/or heat treated, annealed or tempered, the anti-reflection coating or coatings being capable of undergoing these operations without their optical properties being adversely affected.

12. The glazing pane according to claim 1, further comprising at least one coating having a solar protection function, composed of one or more layers selected from the group consisting of dielectric/silver/dielectric, and dielectric/silver/dielectric/silver-/dielectric,
    or a filtering layer selected from the group consisting of TiN layer, and metal layer.

13. The glazing pane according to claim 12, further comprising a glass substrate and a laminated structure, with the coating having a solar protection function and/or a coating having an alarm function placed on one and/or other of an internal face 2, 3 of the glass substrate.

14. The glazing pane according to claim 1, further comprising at least one electrically conductive coating having an alarm function, wherein the electrically conductive coating is optionally in the form of a conductive layer or of an array of conductive wires.

15. The glazing pane according to claim 1, characterized in that the "A" antireflection coating is covered with a coating having photocatalytic properties and having an anti-soiling function, which coating is optionally based on titanium oxide.

16. The glazing pane according to claim 1, further comprising a monolithic or laminated structure, characterized in that an optical thicknesses of the layers of the said "A" or "A'" antireflection stack(s) reduce the light reflection $R_L$ to values of less than 1.5% at normal incidence.

17. The glazing pane according to claim 16, characterized in that at least one of the antireflection stacks comprises
either two layers, including a high-index first layer having an optical thickness of between 15 and 50 nm, and a low-index second layer having an optical thickness of between 160 and 200 nm,
or three layers including an intermediate-index first layer having an optical thickness of between 100 and 140 nm, a high-index second layer having an optical thickness of between 210 and 260 nm, and a low-index third layer having an optical thickness of between 100 and 150 nm.

18. An article selected from the group consisting of interior or exterior glazing pane for buildings, shop window, shop counter, vehicle windows, side windows, rear window, and sunshine roof, comprising the glazing pane according to claim 1.

19. The glazing pane according to claim 1, which comprises a monolithic or laminated structure and at least one glass substrate, and wherein the optical thicknesses of the layers of the "A" and/or "A'" antireflection stack(s) and the glass substrate or substrates are selected so as to reduce the light reflection at normal incidence to values of less than 7% and at 60° incidence to values of less than 10%, keeping the light transmission $T_L$ at normal incidence at values of at least 75% and the selectivity $T_L/T_E$ at values of at least 1.65.

20. An article selected from the group consisting of windscreen, and laminated windscreen for an automobile or train, comprising the glazing pane according to claim 1.

21. The glazing pane according to claim 1, characterized in that the "A" antireflection stack(s) comprise three layers which include an intermediate-index first layer having an optical thickness of between 160 and 210 nm, a high-index second layer having an optical thickness of between 300 and 350 nm, and a low-index third layer having an optical thickness of between 120 and 170 nm.

22. An article selected from the group consisting of picture protection glass, anti-glare protection screen for a computer, decorative glass, glass furniture, mirror, fire-protection pane, flame-barrier pane, and fire-break glazing pane, comprising the glazing pane according to claim 1.

23. The glazing pane according to claim 1, wherein the high-refractive-index layers have a refractive index between 1.90 and 2.60.

24. The glazing pane according to claim 1, wherein the high-refractive-index layers have a refractive index between 2.10 and 2.45.

25. The glazing pane according to claim 1, wherein an outermost layer is a low-refractive index layer.

26. A glazing pane, comprising:
an "A" antireflection coating on at least a first external face thereof and an "B" antireflection coating on a second external face thereof, wherein each of the "A" and "B" antireflection coatings consist essentially of a stack of layers of materials having alternately high and low refractive indices, and
wherein at least some of the layers and at least a final layer of the "A" stack are pyrolyzed layers,
wherein at least some of the layers of the "B" stack are vacuum-deposited layers,
wherein the low-refractive-index layers have a refractive index between 1.35 and 1.70;
and wherein the high-refractive-index layers have a refractive index of at least 1.85.

27. The glazing pane according to claim 26, wherein the high-refractive-index layers have a refractive index between 1.90 and 2.60.

28. The glazing pane according to claim 26, wherein the high-refractive-index layers have a refractive index between 2.10 and 2.45.

29. The glazing pane according to claim 26, wherein the low-refractive-index layers have a refractive index between 1.38 and 1.65.

30. The glazing pane according to claim 26, wherein the vacuum-deposited layers are deposited by sputtering.

31. The glazing pane according to claim 26, wherein an outermost layer is a low-refractive index layer.

32. The glazing pane according to claim 26, wherein in at least one of the "A" or "B" antireflection coating(s), a first "high-index layer/low-index layer" sequence of layers is replaced by an intermediate-index layer (4) having an index of between 1.70 and 1.85 and which is optionally a layer based a material selected from the group consisting of silicon oxynitride, silicon oxycarbide, $SiO_xN_y$, $SiO_xC_y$, tin oxide, and mixtures thereof.

33. The glazing pane according to claim 26, comprising a structure selected from the group consisting of:
a laminated structure, comprising at least two glass substrates (1, 10) joined together by means of a sheet (11) of polymer material, wherein the polymer material is optionally PVB, and
an asymmetric laminated structure comprising a glass substrate and at least one sheet of polymer wherein the polymer is optionally polyurethane.

34. The glazing pane according to claim 26, further comprising a monolithic or laminated structure, wherein an optical thicknesses of the layers of the said "A" or "B" antireflection stack(s) reduce the light reflection $R_L$ to values of less than 1.5% at normal incidence.

35. The glazing pane according to claim 26, which comprises a monolithic or laminated structure and at least one glass substrate, and wherein the optical thicknesses of the layers of the "A" and/or "B" antireflection stack(s) and the glass substrate or substrates are selected so as to reduce the light reflection at normal incidence to values of less than 7% and at 60° incidence to values of less than 10%, keeping the light transmission $T_L$ at normal incidence at values of at least 75% and the selectivity $T_L/T_E$ at values of at least 1.65.

* * * * *